United States Patent [19]

Hall et al.

[11] Patent Number: 4,662,348
[45] Date of Patent: May 5, 1987

[54] BURNISHING DIAMOND

[75] Inventors: David R. Hall, Provo; H. Tracy Hall, Jr., Orem; Christian L. Lauridsen, Springville, all of Utah

[73] Assignee: Megadiamond, Inc., Provo, Utah

[21] Appl. No.: 747,163

[22] Filed: Jun. 20, 1985

[51] Int. Cl.⁴ .............................................. F41B 15/00
[52] U.S. Cl. ................ 125/30 R; 51/283 R; 51/165.73; 384/907.1
[58] Field of Search ............... 51/229, 165.73, 283 R, 51/125, 125.5; 125/30 R, 30 WD; 384/907.1

[56] References Cited

U.S. PATENT DOCUMENTS

| | | | |
|---|---|---|---|
| 2,931,351 | 4/1960 | Custers | 125/30 R |
| 3,436,868 | 4/1969 | Christensen | 125/30 R |
| 3,698,513 | 10/1972 | Espunes | 384/907.1 |
| 3,886,695 | 6/1975 | Elbe | 51/283 R |
| 3,902,283 | 9/1975 | Bean | 51/125.5 |
| 4,370,835 | 2/1983 | Schneidemesser | 51/111 R |
| 4,401,876 | 8/1983 | Cooper | 125/30 R |
| 4,425,900 | 1/1984 | Bosschaert | 125/30 R |
| 4,484,418 | 11/1984 | Reich | 51/283 R |

Primary Examiner—Harold D. Whitehead
Attorney, Agent, or Firm—Christie, Parker & Hale

[57] ABSTRACT

Scratch-free polished diamond is obtained by rubbing a surface of the diamond to be polished against a smooth complementary diamond surface with sufficient pressure and velocity to heat the surface being polished above the spontaneous thermal degradation temperature of the diamond. Such a method can be used to burnish diamond-on-diamond bearings in as little as ten minutes as compared with up to three weeks by prior polishing techniques. Excessive thermal degradation of the diamond is avoided by cooling the surface being polished, preferably by cooling intermittently. The same techniques are usable for other superhard material such as cubic boron nitride.

16 Claims, 12 Drawing Figures

BURNISHING DIAMOND

FIELD OF THE INVENTION

This invention relates to a method for rapidly polishing diamond which achieves a scratch-free surface. It is particularly useful for finishing polycrystalline diamond bearing surfaces.

BACKGROUND

As is well known, diamond is the hardest substance known and is therefore difficult to polish. Other materials can be polished with harder substances, but diamond is polished only with diamond in the form of diamond powder or "grit". Polishing is necessarily slow and a large amount of diamond abrasive powder is consumed.

Polishing is desirable not only on natural gem stones but also on synthetic and polycrystalline diamond used for industrial purposes. For example, bearings have recently been devised with both bearing faces being made of polycrystalline diamond. The diamond faces are complementary and are polished smooth to take advantage of the low coefficient of friction of diamond-on-diamond (in the order of 0.02).

Polishing of a pair of complementary conical bearing surfaces can be considered as an example of the shortcomings of prior polishing techniques and an advantage of this invention. Each of the bearing surfaces comprised areas of polycrystalline diamond that collectively formed a conical surface, one external cone and one internal cone. The bearings were ground and polished by relative rotation with the bearing surfaces engaged, using diamond grit as an abrasive between the bearing surfaces. As much as 0.2 millimeters (0.005 inch) of material was removed from some areas of each diamond surface. Such polishing by conventional techniques took as long as three weeks for each bearing pair and about 25 carats of diamond grit was consumed for each 6.5 square centimeter (one square inch) of polished surface. Substantial costs are involved, not only for the diamond grit but also for the polishing equipment used for such a long interval.

By comparison a similar bearing has been burnished according to this invention in less than one hour with no consumption of diamond grit. This was accomplished with manual adjustments and is believed that with automatic control of burnishing the total time for polishing can be measured in minutes instead of in weeks.

As mentioned above, polishing is desirable for polycrystalline diamond surfaces. Polycrystalline diamond is usually, but not necessarily, made from synthetic diamonds rather than natural diamonds. Synthetic diamonds are typically made by subjecting graphite to high temperature at a sufficiently high pressure that diamond is the thermodynamically stable crystal structure for carbon. Conversion of graphite to carbon is preferably conducted in the presence of a catalytic metal such as cobalt. Diamond can be synthesized at a pressure of 65 kilobars and 1500° Kelvin. Various other pressures and temperatures can be used as is well known to those skilled in the art.

Depending on the operating parameters during synthesis of diamond various crystal sizes of diamond can be produced. Much of the diamond is in the form of individual crystals, although twins and other polycrystalline forms are not uncommon.

Polycrystalline diamond for industrial purposes such as bearings can be made by subjecting a mass of diamond crystals to high temperatures and pressures for sintering the diamond and producing diamond-to-diamond bonds between crystals. Such sintering can be without catalyst as described by H. Tracy Hall in *Science*, Volume 169, Aug. 28, 1970, pages 868 and 869.

Alternatively, diamond can be sintered in the presence of a catalytic metal such as cobalt as described in U.S. Pat. No. 3,141,746. Other techniques for forming polycrystalline diamond can also be practiced. If desired, a layer of polycrystalline diamond can be formed on a cemented carbide backing. Such product is desirable for bearings and for a variety of other industrial applications where the strength and stiffness of the cemented carbide helps support the diamond layer.

Typically, conventional polishing commences with relatively coarse hard grit which continually scratches the surface of the material being polished until all of the scratches remaining on the surface are as small as can be made with that size grit. The next step is to polish with a smaller size grit until all of the larger scratches are removed and the only remaining scratches are the smallest that can be produced with this second size grit. This continues with successively smaller grit sizes until the desired degree of polishing is obtained.

At this stage, the largest scratches remaining in the surface are about half the size of the grit being used. For polishing diamond, the smallest practical grit size is about one micron. Thus, a typical well-polished diamond surface has one-half micron scratches.

"Grit" refers to discrete particles of abrasive in a chosen size range used for polishing. For most purposes, the grit is harder than the material being polished. When diamond is being polished, the grit is diamond powder. Polishing grit is continually reduced in size during polishing and must be replenished as it is consumed. For most polishing the grit is "loose", that is, it is not attached to either surface and can tumble or slide in the polishing interface. During lapping the grit is pressed into the surface of the lap so as to be more or less held in place and caused to slide across the surface being polished. The particles become blunted as edges break or wear away and the polished surface has rounded scratches.

Another common characteristic of polished surfaces is waviness. Waviness is a periodic or aperiodic wavelike variation from a perfect surface which is generally much larger and wider than the roughness in the form of scratches left by grinding or polishing. Depending on the application of the product, waviness may be undesirable while minute scratches can be tolerated. For example in gauge blocks, the polished steel surface has little waviness but on a microscopic scale is scratched. Polished metallographic specimens may have moderate waviness but are commonly etched to provide a scratch-free surface.

Diamond can be roughly cut by a technique known as bruting. This involves cutting a diamond by rubbing it with another diamond or diamond chip. There is considerable chipping of the diamond surface and a very rough surface is obtained, which is then polished by conventional grit polishing.

A technique where the surface is polished by rubbing with a hard smooth object can be used for polishing some materials such as metals. This is often referred to as burnishing. For example, silver or leather can be burnished with a steel tool. In this form of burnishing there is plastic flow of the material being polished. Material is not ordinarily removed from the burnished surface, the surface is merely "rearranged". When done with clean tools, the surface may retain appreciable waviness but be largely scratch-free. Burnishing diamond has not been previously considered since there is nothing harder than diamond or with greater compressive strength, nor is diamond subject to plastic flow at anything approaching practical pressures.

SUMMARY OF THE INVENTION

It has been discovered that diamond can be burnished with a complementary diamond surface by rubbing the two surfaces together with a sufficient pressure and velocity to heat the surface being finished above the spontaneous thermal degradation temperature of diamond. Since no grit is present, a scratch-free polished diamond surface can be obtained.

Frictional energy is applied to a surface being burnished sufficiently rapidly to heat the surface to a temperature where diamond is converted to non-diamond. The diamond is cooled and/or the interval of heating is sufficiently short to avoid degradation of any more than a minute surface depth. For example, the surface can be intermittently cooled with water. In such an embodiment the most rapid burnishing is obtained when the diamond surface is heated just to the stage where nucleate boiling of the water occurs.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
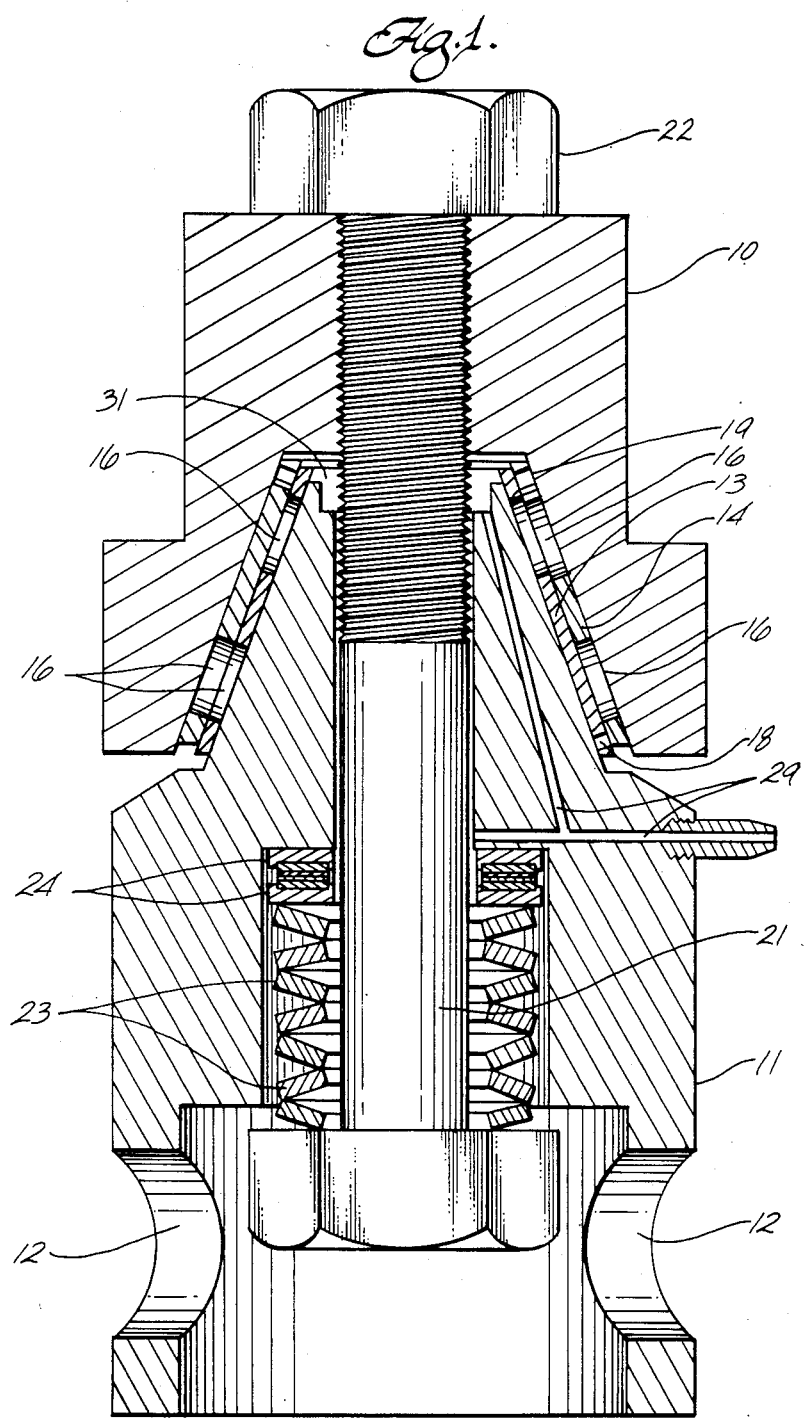
FIG. 1 illustrates in longitudinal cross section an exemplary device for burnishing a set of conical diamond bearing members.

Diamond is a somewhat unique material in that it has a crystal structure that is thermodynamically metastable at ordinary temperature and pressure. If diamond is heated to about 1400° K. in inert gas it spontaneously recrystallizes or graphitizes. It may form amorphous carbon instead of the graphite crystal structure. In the presence of oxidizing substance such as air, diamond may thermally degrade at a lower temperature. In a polycrystalline diamond the presence of a catalytic metal in interstices of the diamond matrix may cause thermal degradation at a lower temperature.

Polycrystalline diamond in some embodiments, such as may be produced in accordance with U.S. Pat. No. 3,141,746 or by other processes, comprises a network of diamond crystals bonded to each other with some interstices containing a catalytic metal, ordinarily cobalt. In an exemplary embodiment, the diamond constitutes 85 to 90% by volume and the cobalt phase the other 10 to 15%. Such a material may be subject to thermal degradation due to differential thermal expansion between the cobalt and diamond. Upon sufficient expansion the interdiamond bonding may be ruptured and cracks and chips may occur. This mechanism of thermal degradation is postulated since it is known that such a material thermally degrades at a temperature lower than the thermal degradation of an otherwise identical material from which most of the cobalt phase has been leached away. The lower temperature thermal degradation may be in part a chemical interaction between the cobalt or carbon, instead of or in addition to degradation due to differential thermal expansion.

Another material with properties analogous to those of diamond is cubic boron nitride. This material has a diamond-like crystal structure that is metastable at ambient temperature and pressure. This material is formed at high temperature and pressure from hexagonal boron nitride in a process analogous to formation of synthetic diamond. Cubic boron nitride thermally degrades upon heating at a temperature somewhat above the thermal degradation temperature of diamond. Cubic boron nitride is extremely hard and in some applications can be substituted for diamond.

Wurtzitic boron nitride is another material produced at high temperature and pressure that has a metastable crystal structure and high hardness. It too will thermally degrade upon heating at ambient pressures.

These materials have a unique characteristic that the lower temperature stable crystal morphology is lamellar hexagonal, a lubricious form with quite low hardness. Many materials have high pressure crystal structures different from ambient pressure structures. For example, quartz will transform into coesite at 800° C. and pressure of 35 kilobars. Under certain conditions, this high pressure form may remain as a metastable structure at ambient temperatures and pressures. Such a material is not suitable for burnishing in practice of this invention since the low pressure form is in the same order of hardness as the high pressure form. Thermal degradation does not produce a soft form like the degradation of diamond and boron nitride. Further, the high pressure crystal structure does not have the extremely high hardness and compressive strength of diamond or cubic or wurtzitic boron nitride. This invention can be practiced with diamond, cubic boron nitride or wurtzitic boron nitride.

These materials are sometimes referred to collectively as superhard materials. No other compositions are currently known to be in this class.

Friction bearings where one material rubs against a similar or dissimilar material, with or without lubrication, have frictional heating at the bearing interface.

Such heating is dependent upon the pressure at the bearing interface, relative velocity between the surfaces and coefficient of friction. Practical bearings have a limit on the pressure, which may be determined by the compressive strength of one of the materials making up the bearing interface. Practical bearings ordinarily have a velocity limit as well.

An important parameter of bearings is the product of pressure times velocity, Pv, where P is pressure and v is linear velocity of the rubbing contact. In English units, pressure is ordinarily expressed in pounds per square inch and velocity in feet per minute.

In such units, a dry carbon-graphite bearing may have a limiting Pv of 15,000 foot pounds per square inch minute or 52.5 watts per square centimeter. Friction bearing with lubrication can have much higher Pv values depending on the service required. A well lubricated friction bearings of hard materials will run indefinitely with a Pv of 40,000. A sintered bronze bearing impregnated with lubricant may have a limiting Pv of 50,000 for a reasonable useful life.

In another example, the friction journal bearing of a cutter cone mounted on a rock bit may have a conventional high strength hard facing alloy as one bearing material and aluminum bronze as another bearing material. Such a bearing has sealed-in lubricant and under service conditions has a Pv of 200,000.

In contrast, an exemplary embodiment for burnishing diamond in practice of this invention employs a final Pv in excess of 1,000,000 or 3.5 kilowatts per square centimeter. Burnishing is also dependent on adequate cooling for avoiding subsurface thermal degradation, but too much cooling can completely prevent burnishing. The Pv actually used may be more or less, depending on the effective rate of cooling. In an exemplary embodiment Pv may be as much as 10,000,00 or 35 kilowatts per square centimeter.

It is preferred that burnishing of diamond be conducted at a Pv in the range of 2,000,000 to 10,000,000 foot pounds per square inch minute or 7 to 35 kilowatts per square centimeter. When Pv is less than 7 kilowatts per square centimeter the rate of burnishing is low and to maintain a high rate, cooling water flow must be carefully controlled to avoid excessive thermal degradation. It is easier to maintain a high rate of burnishing with a higher Pv. Further, a Pv of 7 kilowatts per square centimeter is at least twice the Pv contemplated for bearing applications. When Pv is more than 35 kilowatts per square centimeter, a high flow of water must be used to avoid excessive thermal degradation and a small decrease in flow can have drastic results. Further, the higher pressures and velocities require more costly equipment which is not needed for high volume production.

Diamond has a very high thermal conductivity so that frictional heat is removed from the surface quite rapidly. Frictional heating at the surface is a function of Pv and the coefficient of friction. In order to burnish diamond, frictional energy must be added sufficiently rapidly to heat just a surface layer to the thermal degradation temperature. Heat must also be withdrawn from the diamond sufficiently rapidly to prevent thermal degradation at any substantial distance beneath the surface. The result is apparently thermal degradation in a uniform layer at the rubbing surface. Application of frictional heat at too high a rate may cause non-uniform thermal degradation beneath the surface and roughening rather than smoothing.

The area of the surface layer being degraded depends on how well the complementary surfaces actually fit together. When burnishing commences, the complementary surfaces may have slightly higher and lower areas due to manufacturing variations. The high areas will rub together during initial burnishing and a surface layer is degraded in such areas. As burnishing progresses these areas of contact become larger. With a given load or force between the surfaces, the pressure at the beginning of burnishing would be higher than at the end because the area of contact is smaller. Thus, the force applied is preferably increased as burnishing progresses to maintain a high rate of material removal. When burnishing polycrystalline diamond, the area of the surace layer is very much larger than the crystals of diamond. Although the crystal size in polycrystalline diamond can be provided over a broad range, one example may have diamonds about 60 microns across commingled with smaller crystals. Even near the beginning of burnishing the areas being thermally degraded extend for millimeters instead of microns.

It is believed that non-steady state or intermittent frictional heating may be most desirable for burnishing diamond or other superhard material. In a steady state situation, frictional heating may be applied at the surface being burnished with heat being extracted from the opposite face of the diamond. A temperature gradient is established through the diamond which is more or less linear, deviating from linearity to the extent that the coefficient of thermal conductivity varies as a function of temperature.

In non-steady state frictional heating, which is preferred for burnishing diamond in practice of this invention, the temperature gradient adjacent to the surface being heated can be extremely high when the rate of energy input at the surface is high and an extremely thin layer at the surface thermally degrades. It is desirable to employ non-steady state frictional heating for ease of assuring that thermal degradation beneath the surface does not occur.

It is therefore desirable to intermittently frictionally heat the diamond surface being burnished and intermittently cool the surface for maintaining the bulk temperature of the diamond substantially below any thermal degradation temperature, while also rapidly heating a thin surface layer above the thermal degradation temperature.

It is therefore desirable to rub the diamond being burnished against a discontinuous rigid complementary diamond surface with a cooling fluid in the discontinuities in the surface. The discontinuous diamond surface can be provided by a plurality of separate areas of diamond spaced apart from each other, or grooves can be provided in the surface of the diamond being used for burnishing. Preferably a cooling medium such as water is circulated through the discontinuities of the diamond surface for extracting heat from the diamond being burnished.

The rate of cooling influences the rate of burnishing. If there is too much cooling, there is essentially no burnishing. If there is inadequate cooling, excessive thermal degradation occurs. The most rapid burnishing occurs when the cooling rate is slightly more than the medium required to prevent massive thermal degradation.

For example, assuming a constant Pv of 3,000,000, a high flow rate of water, particularly if pressurized to a few atmospheres, can withdraw heat from the diamond surface by convective heat transfer sufficiently rapidly to prevent burnishing. There is virtually no wear of the diamond and a bearing operating under such conditions may run indefinitely.

Conversely when water cooling is provided at a low rate at ambient pressure, film boiling may occur at the diamond surface, drastically reducing the rate that heat is extracted. When this occurs, massive thermal degradation of the diamond beneath the surface may occur and within seconds such a bearing will "freeze."

The most rapid burnishing is obtained with an intermediate range of cooling where nucleate boiling occurs at the diamond surface. Such rapid extraction of heat permits the surface temperature to intermittently exceed the thermal degradation temperature, yet maintains the bulk of the diamond well below the thermal degradation temperature.

When operating burnishing apparatus manually, such nucleate boiling is audible as the water vapor bubbles collapse. Conversely, if there is steaming of the cooling water, film boiling may occur with consequent damage to the diamond. Suitable manual control can be provided by maintaining a given Pv and gradually reducing the rate of cooling water flow until nucleate boiling becomes audible. Flow is then increased slightly to provide a margin to prevent inadvertent damage to the diamond. Nucleate boiling can be detected as a "sizzle" in the apparatus. Thus, it is preferable to burnish diamond at or just below a sizzle.

The pressure of the cooling water is another variable to be aware of and possibly use for control. Pressurizing the cooling water inhibits boiling and can be used to prevent film boiling which would significantly lower cooling rate and cause excessive thermal degradation. For example, a given Pv and water flow rate at atmospheric pressure may result in film boiling and damage to a rock bit bearing made of diamond. The same Pv and water flow may be adequate when the same bearing is in use for drilling a well since the hydrostatic head in the well prevents film boiling and assures adequate cooling to prevent thermal degradation. Thus, one could hold Pv and flow rate constant and control pressure of the cooling water to maintain nucleate boiing for rapid burnishing. It is believed that this is more difficult than controlling bearing pressure, velocity or coolant flow rate.

It is apparent that thermal degradation of a surface layer of diamond to non-diamond is occurring during burnishing. An extremely fine black residue is formed and carried away in the cooling water. It is believed that this material is amorphous carbon, or it may have a graphite crystal structure. Either way, the non-diamond form is much softer and weaker than the diamond and is readily swept away from the interface. Any other non-diamond material, such as cobalt catalyst or metal carbides in interstices of polycrystalline diamond, is also swept from the interface. Another indication that non-diamond carbon is being formed is found in the coefficient of friction. When there is significant burnishing, the coefficient of friction is noticeably higher than when there is no burnishing. For example, when burnishing commences at a given force, the coefficient of friction is high, probably because the interface comprises carbon-on-carbon or carbon-on-diamond rubbing. Later the rate of burnishing decreases, producing less carbon, and the coefficient of coefficient of friction decreases as the rubbing becomes primarily diamond-on-diamond.

When a large surface area of diamond is used in burnishing, polycrystalline diamond is preferred, namely diamond with a continuous network of diamond to diamond bonding. Such a material has the strength to resist dislodging of significant diamond from the surface. This is to be contrasted with a surface containing diamond made by infiltration techniques in which individual diamond crystals are set in a metal or metal carbide matrix. The bonding achieved is not sufficient to secure all of the diamonds in place under the high Pv conditions of burnishing.

Polycrystalline diamond commonly includes other material in interstices of the diamond network. Cobalt or other catalyst, silicon or silicon carbide, and cemented tungsten carbide are examples of such materials. (See, for example, U.S. patent application Ser. No. 600,399, filed Apr. 16, 1984, and assigned to the same assignee as this application, the subject matter of which is hereby incorporated by reference.) Such interstitial materials do not interfere with burnishing since much weaker and softer than the diamond. Exemplary polycrystalline diamond has from 70 to 95 percent by volume diamond and from 5 to 30 percent by volume non-diamond material in the interstices. Diamond sintered at high pressure and high temperature (in the diamond forming range) with less than 70 percent by volume diamond has extensive diamond-to-diamond bonding and is hence considered polycrystalline. There may not, however, be a continuous network of intercrystalline bonding throughout such a body. It is preferred to employ polycrystalline diamond with a continuous network of diamond bonding for burnishing in practice of this invention.

FIG. 1 illustrates in longitudinal cross section a device for manually burnishing a pair of conical diamond bearings such as may be used as a combined radial and thrust bearing for supporting a cutter cone on a rock bit. An exemplary concial bearing is illustrated in perspective in FIG. 2. Unless indicated otherwise, the parts of the burnishing device illustrated in FIG. 1 are round in transverse cross section.

The two principal parts of the diamond burnishing device are a conical steel socket 10 and a conical steel plug 11. When used, the socket is securely chucked in the head stock of a lathe for rotation. A bar (not shown) is inserted through a transverse hole 12 in the plug to prevent rotation of the plug.

A conical bearing set comprising an inner sleeve 13 and an outer sleeve 14 are fitted between the socket and plug for burnishing. As can be better seen in FIG. 2, a representative inner sleeve comprises a conical steel member supporting a plurality of circular bearing pads 16. Each bearing pad comprises a substrate of cemented tungsten carbide with a layer of polycrystalline diamond (not separately shown) on its exterior face. Each pad is curved to have a conical surface at both the interior and exterior of the sleeve. Each of the bearing pads is brazed into the sleeve with a silver solder having a melting point below the thermal degradation temperature of diamond. On the interior of the sleeve, the cemented tungsten carbide faces are a continuation of the conical interior face of the cone; that is, on the interior of the sleeve, there is a smooth continuous conical surface. When placed in service, this interior conical surface seats on the journal of the leg of a rock bit. If necessary to obtain a good fit, the interior of the sleeve can be ground after brazing the bearing pads in place.

On the exterior of the cone, the face of each bearing pad extends slightly beyond the face of the steel sleeve. For example, the face may protrude from the outer surface of the sleeve 0.4 to 0.8 millimeters. The resulting space between the inner and outer sleeves around the bearing pads provides a path for cooling fluid during service of the bearing and also for the cooling fluid during burnishing. The height of the pads above the steel surface is selected for assuring adequate cooling during service of the bearing.

The diamond layer on the surface of each bearing pad comprises polycrystalline diamond sintered in a high temperature, high pressure process. In an exemplary embodiment, the surface layer comprises 90% by volume diamond and 10% by volume cobalt. Crystal size is in the range of 1 to 60 microns, primarily in the range of 40 to 60 microns. The diamond layer may be 0.75 millimeters thick before burnishing. As much as 0.1 to 0.15 millimeters of diamond may be removed during burnishing.

The outer sleeve 14 is similar in construction to the inner sleeve. The diamond bearing pads are, however, reversed, with the cemented carbide substrate being at the exterior of the cone and the diamond layer being inside. The exterior of the sleeve and inserts is ground to a smooth continuous conical surface. The interior face of each of the bearing pads in the outer sleeve extends above the inside face of the outer sleeve a small distance, e.g., 0.4 to 0.8 millimeters. Collectively, the diamond faces of the outer bearing pads form a conical surface complementary to the conical surface formed by the outside faces of the bearing pads in the inner sleeve.

In an exemplary embodiment, the smaller diameter of the sleeves at the bearing interface between the inner and outer sleeves is 35.5 millimeters. The larger diameter of the conical bearing interface is 71 millimeters. The included half angle of the cone is 20°. Each of the bearing pads has a diameter of 12.7 millimeters.

In this embodiment, the pads are arranged in two circumferentially extending rows in each sleeve. A different number of bearing pads are employed in the corresponding inner and outer rows so that a substantial area of bearing interface always remains in contact in each row. For example, the two rows in the inner sleeve may have six and nine inserts, respectively, while the complementary rows in the outer sleeve have eight and eleven bearing pads, respectively. Sleeves with other included angles, three rows of inserts, different numbers of inserts and different sizes are also usable.

The inner sleeve 13 has a plurality of notches 17 around its larger end. Each notch is located midway between a pair of bearing pads in the larger row. An equal number of pins 18 protrude from the plug 11 so that when fitted into the notches in the sleeve, the sleeve is prevented from rotating. Similarly, the outer sleeve 14 has a plurality of notches (not shown) at its smaller end which engage a like number of pins 19 in the socket for preventing rotating of the outer sleeve. Similar pin arrangements are used on the leg journal and cone of a rock bit to hold the sleeves stationary.

The plug 11 is connected to the socket 10 by a high strength bolt 21. The bolt extends through the axis of the plug and is threaded into the socket with a selected torque as hereinafter described. Once assembled to the desired torque, a lock nut 22 is threaded tight against the end of the socket to lock the bolt tightly in position, thereby preventing further tightening or loosening of the bolt. A number of heavy duty Belleville washers 23 are provided between the bolt head and the body of the plug to act as a spring.

Figure 3:
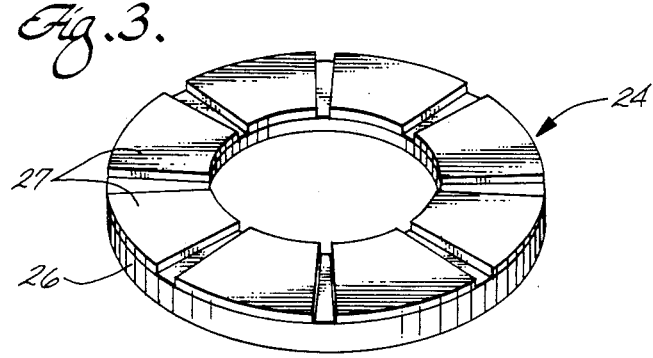
FIG. 3 illustrates in perspective one member of a thrust bearing used in the device of FIG. 1.

A thrust bearing 24 is mounted between the Belleville washers and the body of the plug. The thrust bearing comprises a pair of substantially similar rings, one of which is illustrated in FIG. 3. Each ring comprises a rigid steel washer 26 supporting a plurality of diamond bearing sectors 27. Each bearing sector comprises a substrate of cemented tungsten carbide and a surface layer of polished or burnished polycrystalline diamond. The tungsten carbide substrate is brazed to the steel washer so that the diamond faces of the sector are coplanar. The two bearing rings of a set differ only in the number of sectors in each ring. The ring illustrated in FIG. 3 has, for example, eight sectors. The ring used with that one to form a thrust bearing has nine sectors.

The thrust bearing rings are fitted between the plug 11 and Belleville washers 23 with the diamond faces of the sector 27 forming a bearing interface. No special means need be provided for preventing rotation of the rings relative to the washers and plug since the coefficient of friction of steel-on-steel is as much as twenty times the coefficient of friction of polished diamond-on-diamond. Relative rotation therefore occurs at the diamond bearing interface. The spaces between adjacent sectors of diamond on the rings provide radial cooling fluid passage through the thrust bearing.

A plurality of cooling fluid passages 28 are drilled through the plug. In an exemplary embodiment, three or more passages may be used as required to obtain adequate flow of water. The passages convey water to an annular space 31 between the end of the plug and the base of the socket adjacent to the small end of the bearing sleeves. The water flows through the conical bearing interface to escape between the plug and socket. Water is also supplied into the annular clearance between the bolt and plug. This delivers water to the thrust bearing 24 for self-pumped flow through the spaces between the sectors 27 of the rings. In another embodiment, the outer end of the plug can be closed and water forced through the annular clearance between the bolt and plug for delivery to both bearing interfaces.

When it is desired to burnish a set of conical bearing sleeves, the device is assembled as illustrated in FIG. 1. Initially the bolt is tightened with a torque of 0.7 kilogram meters. Because of the pitch of the threads in the socket and the angle of the cone, this applies a normal force on the conical bearings of about 135 kilograms. The lock nut is tightened to prevent loosening. The socket end of the assembly is then chucked in a lathe. A bar is inserted through one of the holes 12 in the plug 11 to prevent the plug from rotating. Preferably the bar is connnected to a spring balance or the like so that the friction force or torque across the bearing interfaces can be determined.

The lathe is started at a relatively low speed such as 100 RPM. Since there are surface asperities and other irregularities to be burnished away, the actual area of contact between the bearing pads is less than the total bearing area. Thus, even at the relatively low loads and rotational speeds used at the beginning of burnishing, there are areas where the Pv is sufficiently high to thermally degrade some of the surface. It is observed that initially the bearing torque is high. After several seconds of running, the diamond surfaces are burnished to the extent that the local Pv is insufficient for further thermal degradation. It is observed that the torque drops to a low value, for example, about one-third of the initial torque and remains steady indefinitely at that Pv. The initial noisy operation of the bearing also drops off rapidly.

This observed effect is believed due to asperities on the rubbing surfaces being in contact so that the actual area of contact between the surfaces is fairly high. Thus, the localized Pv at the surface is above the apparent average Pv. The diamond does not deform, instead the asperities "burn off" or thermally degrade. As they do, the actual Pv decreases until it drops below a threshold where, under the prevailing cooling conditions, thermal degradation no longer occurs. It may be that during the very beginning of erosion of the asperities, the rough surfaces have a relatively high coefficient of friction. When the asperities wear down, the surfaces seem smooth and friction drops. The reason friction increases when Pv is again increased is not as apparent. It may be that the surface roughens again as thermal degradation proceeds non-uniformly beneath the minute surface layer. This temporary condition may persist until the actual contact area again drops the Pv below the burnishing threshhold. It is more probable that the non-diamond carbon produced in the interface has a higher coefficient of friction than diamond-on-diamond, and higher friction may persist until such products are swept from the interface and further decomposition of the diamond diminishes. It is safe to say that the observed effect is not fully understood.

When the torque has dropped to a steady level, the speed of the lathe is increased to increase the Pv on the bearing. A similar cycle of increased torque followed by a decrease to a steady value is observed. This cycle is repeated until the desired maximum speed of the lathe is reached. The entire assembly is then removed from the lathe and the bolt is tightened another 0.7 kilogram meters. The assembly is put back in the lathe and the cycle of gradually increasing speeds repeated. This procedure is repeated until a desired maximum Pv on the bearing interface is achieved. For example, the bolt may be tightened to 7 kilogram meters and the speed increased to 1000 RPM. In an exemplary embodiment, the power required to rotate a set of conical bearing sleeves under such conditions is in the order of 6 kilowatts.

Such a bearing is burnished at conditions at least twice as severe as expected in service. This assures that the bearing will last a long time in service with no noticeable degradation. The severity of service can be considered on the basis of three parameters, pressure P, velocity v, and cooling rate dQ/dt. Preferably the bearing is burnished with $$\frac{Pv}{dQ/dt}$$

at least twice what is to be expected during normal service of the bearing.

Cooling rate is a sensitive control parameter. There is a sharp change between the amount of cooling that permits rapid burnishing and the amount that prevents any burnishing. For example, in one experiment on a set of conical bearings being burnished, a cooling water flow of 3.8 liters per minute permitted removal of 0.05 millimeters of diamond from each of the two surfaces in ten minutes. When cooling water flow rate was increased 30% to 4.9 liters per minute the bearings were run for several hours with no wear being observable. Polished diamond-on-diamond bearings show no wear in the usual sense when run with sufficient cooling. Thus, there is a distinct cooling limit for burnishing. Below the limit surface temperature is high enough that there is thermal degradation; above the limit nothing happens to the diamond. The limit is readily observed experimentally by varying cooling rate. It is not as readily predicted by calculation.

It will be noted that in a device as described and illustrated in FIG. 1, there is a high Pv on the thrust bearing 24 at the same time that the diamond-bearing pads in the conical sleeves are being burnished. The relative areas of the thrust bearing and conical bearing, the angle of the conical bearing, and the radial distance of the bearing surfaces from the axis of rotation combine to provide a Pv on the conical bearings at least 2.5 times the Pv on the thrust bearing. Thorough cooling of the thrust bearing is also provided. Under these conditions, rapid burnishing of the conical bearing can be achieved with essentially no wear on the thrust bearing. During burnishing the energy dissipation in the thrust bearing is less than 10% of the energy dissipation in the bearing being burnished. The thrust bearing is initially burnished in the same manner as the conical bearing. In the first run with a new thrust bearing, it burnishes at the same time as the conical bearing.

During the initial stages of burnishing, with relatively low bolt torque and lathe speed, a relatively low flow of coolant water between the sleeves enhances the rate of burnishing. As burnishing proceeds to higher loads and speeds, increased water flow is provided to assure that thermal degradation does not proceed beneath an extremely thin surface layer. It is observed that if there is insufficient cooling, film boiling may occur at the diamond surfaces and within seconds the bearing torque increases to "freeze" the bearing and stall the lathe. It is generally found that the resultant thermal degradation is in a thin layer, however, and that by resuming the burnishing cycle at low speeds and pressures, the thermally damaged layer can be removed and the diamond surfaces reclaimed.

Controlled cooling of the surface being burnished is important for proper burnishing. There should be sufficient cooling that only a thin, uniform layer at the surface is thermally degraded. If there is inadequate cooling, thermal degradation below the surface actually roughens rather than smooths the surface. If there is too much cooling, the surface does not reach a sufficiently high temperature to thermally degrade and no burnishing occurs. The range of cooling that works during rubbing of the two surfaces can be considered as $$\frac{Pv}{dQ/dt}$$

where dQ/dt is the rate of heat removal from the surface by cooling water. During initial burnishing when apparent Pv is low since the area of contact is low, moderate heat removal is appropriate. As Pv increases, so must cooling. Cooling is maintained in the range sufficient to elevate the temperature of a surface layer above the temperature where diamond spontaneously decomposes to non-diamond, and insufficient to heat the diamond below the surface layer to the thermal degradation temperature.

Preferably such cooling is applied intermittently at the surface being polished. This occurs in the conical bearings because of the discontinuities in the complementary surfaces; that is, the recessed areas between the bearing pads. Water flows through these recesses and the bearing pads are alternately heated by friction on an opposing pad and quenched by water between the pads. This intermittent cooling inhibits thermal degradation of the diamond in both complementary surfaces.

The burnishing can be accomplished by changing any of three variables separately or collectively. These are pressure P on the area being burnished, velocity v between the two surfaces, and cooling rate dQ/dt. One can, with a given pressure and cooling rate gradually increase velocity in a controlled manner. Each cycle of the burnishing technique in the device illustrated in FIG. 1 is exemplary. Alternatively, with constant cooling rate and velocity pressure can be gradually increased. Alternatively, although it is less precise, Pv can be held constant and cooling rate gradually decreased to effect burnishing.

A burnished diamond is free of surface scratches. There are no discrete diamond particles or polishing grit in the interface being burnished, so there is nothing to scratch the surface. In the embodiment just described, surface waviness may remain as an artifact of the original surface irregularities on the diamond pads. Such waviness is in circumferentially extending streaks since the same diamond areas of the inner and outer sleeves are continually rubbed together. Such waviness is acceptable in a conical bearing. In other applications it is desirable to minimize waviness, as well as eliminate scratches and by varying the area of the diamond in contact during burnishing, waviness can be reduced or largely eliminated.

Burnishing is described herein as free from polishing grit since the grit is not needed, is expensive, and may actually reduce the rate of burnishing. Further, addition of grit in the final stages of burnishing could leave surface scratches or rounded grooves. Any diamond grit introduced would be rapidly thermally decomposed and comminuted. Any particles of material soften than diamond would be rapidly destroyed. Thus, burnishing of diamond is provided on a complementary diamond surface and temporary presence of grit is not material.

Figure 2:
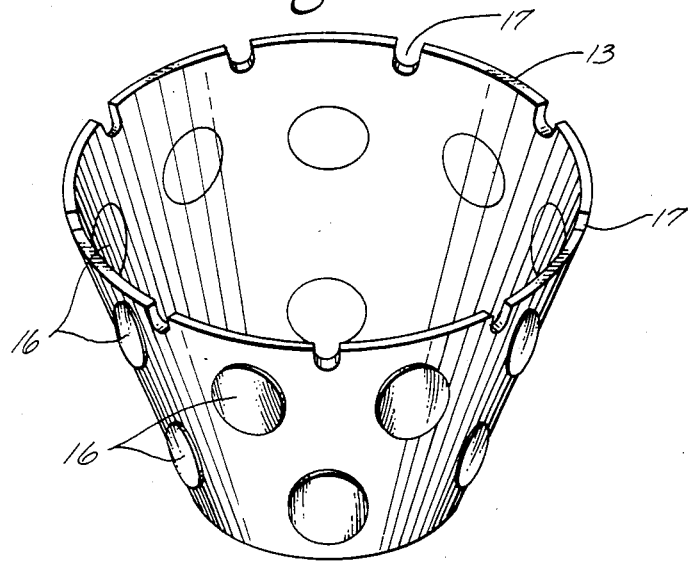
FIG. 2 illustrates in perspective such a conical diamond member.
Figure 4:
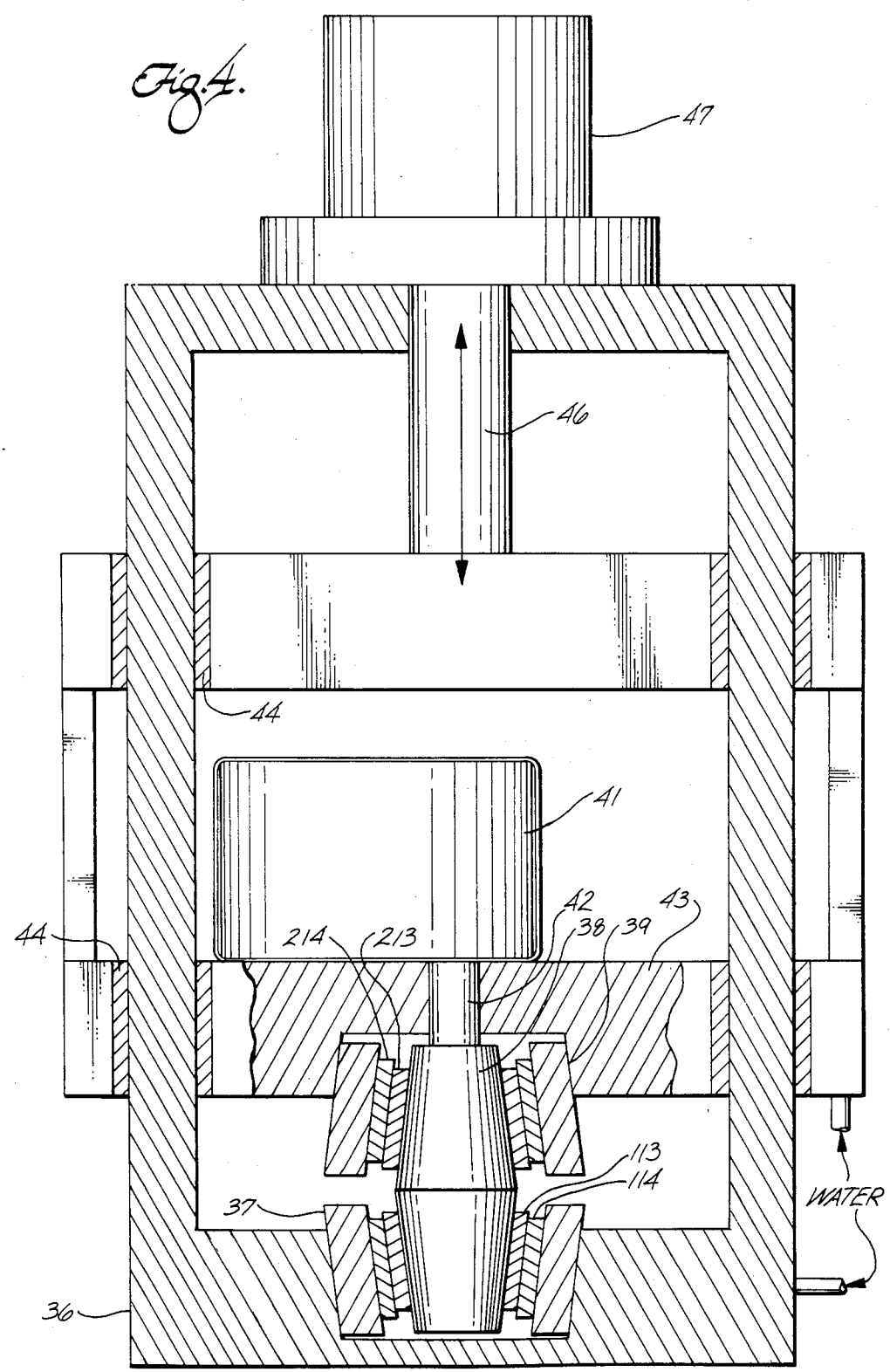
FIG. 4 illustrates semi-schematically in longitudinal cross section apparatus for burnishing a pair of conical bearing sets.

FIG. 4 illustrates schematically apparatus for burnishing diamond where velocity is maintained constant and pressure is gradually increased. If desired, velocity can also be increased preferably in steps. In this apparatus conical bearing sleeves of the type illustrated in FIG. 2 are burnished two sets at a time.

The apparatus has a rigid frame 36, the bed of which supports a lower fixed socket 37. An outer bearing sleeve 114 is fitted into the lower socket 37 and secured against rotation by pins (not shown) as described above with reference to FIG. 1. An inner bearing sleeve 113 is secured on the lower half of a double conical plug 38 by pins (not shown) as hereinabove described. The upper cone of the plug 38 is in an upper socket 39 and another bearing set comprising an inner sleeve 213 and outer sleeve 214 is mounted between the plug and upper socket. The bearing sleeves are also indicated schematically and include diamond bearing pads such as those illustrated in FIG. 2.

The double conical plug 38 is connected to an electric motor 41 by a shaft 42. The motor is mounted on a platen 43 connected to the frame by bearings 44 which permit the platen to move longitudinally on the frame. The platen is connected to the piston 46 of a hydraulic actuator 47 which is securely connected to the frame 36.

The electric motor rotates the double conical plug and inner sleeves 113 and 213. The diamond pads on these sleeves rub against the diamond pads on the outer sleeves 114 and 214 respectively. The hydraulic actuator applies an axial load on the bearings for burnishing the diamonds. The torque required to rotate the two bearing sets is measured, preferably by simply measuring the motor power. The principal component of the torque is the friction force between the bearings or Fv where F is the normal force on the bearings and v is the apparent coefficient of friction. The pressure applied by the hydraulic actuator is continually adjusted to maintain a torque somewhat above the equilibrium torque of the diamond bearings when fully burnished. The torque is measured and a conventional feedback circuit (not shown) increases pressure as torque begins to drop. This maintains a high rate of burnishing so that the bearings can be finished in a matter of minutes. This burnishing apparatus can be operated with constant motor speed and gradually increasing pressure or can be run with motor speed incrementally increasing with varying pressures to obtain a desired Pv.

Cooling water is delivered to the lower bearing set through water passages (not shown) in the lower bed of the frame. Similarly water is delivered to the upper bearing set through passages in the moveable platen.

Burnishing rate can also be controlled by varying cooling water flow to the two sets of bearings. This can be done separately or coordinated with changes in Pv.

As mentioned above, burnished conical diamond bearings have surfaces that are substantially free of scratches. Appreciable waviness may remain when viewed in an axial plane. Little if any, non-circumferential waviness remains. In effect, the diamond bearings form fully complementary surfaces of rotation with the waviness on the inner sleeve being complementary to waviness in the outer sleeve. As a result, the two sleeves of a bearing set are matched and are used together in service. The same is true in bearings that are polished by conventional grit abrasive techniques. It appears that the axial waviness can be minimized by varying both pressure and rotational speed so that the elasticity of the assemblies permits different paths of the inner and outer sleeves to rub together at different stages of the burnishing. Waviness can also be minimized by partly burnishing one set of inner and outer sleeves then swapping one of the sleeves for additional burnishing. By doing this repeatedly the waviness of several sleeves is "averaged" and it is believed that universally usable inner and outer sleeves can be prepared without need for matched pairs.

Figure 5:
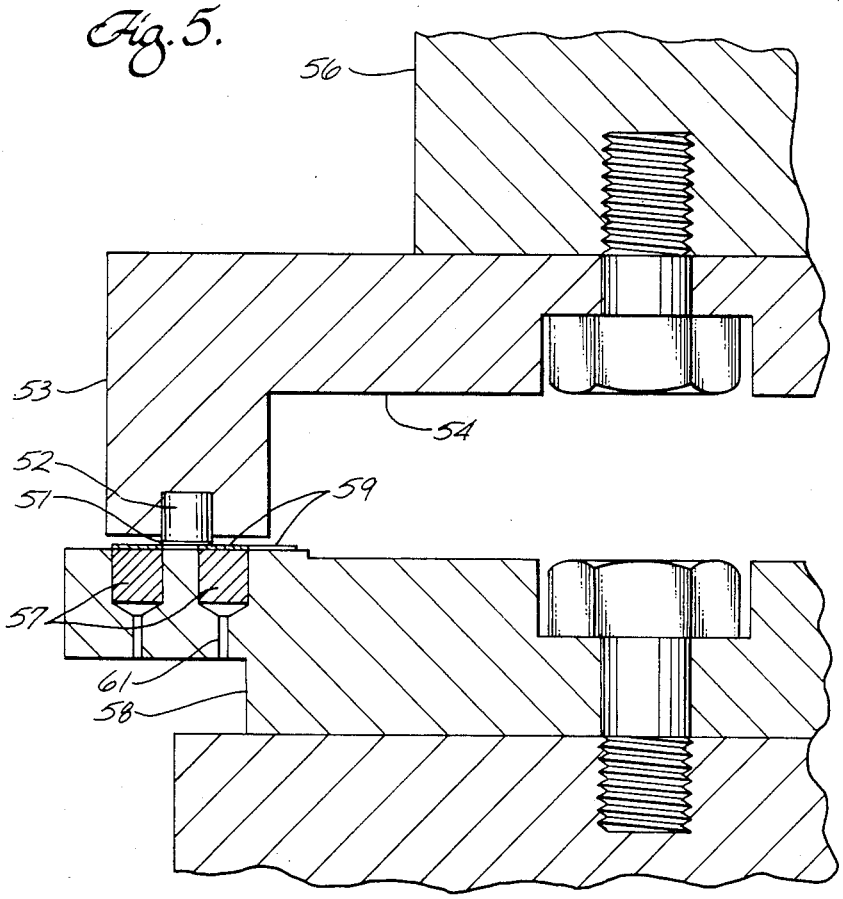
FIG. 5 is a fragmentary, semi-schematic illustration of apparatus for burnishing a flat diamond surface.
Figure 6:
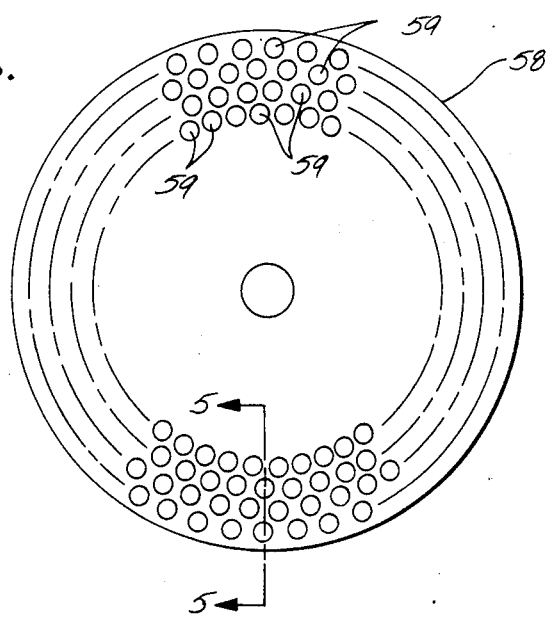
FIG. 6 is a plan view of the face of a burnishing wheel used in the apparatus of FIG. 5.

FIGS. 5 and 6 illustrate schematically apparatus for burnishing a flat diamond face. In the illustrated apparatus, the diamond to be burnished comprises a layer 51 of polycrystalline diamond bonded to a cemented tungsten carbide slug 52. In an exemplary embodiment, the slug and diamond layer may have a diameter of about 12 millimeters and the diamond layer may have a thickness of about 0.5 to 1.0 millimeters.

The slug 52 is secured in one arm 53 of a three or four legged spider 54. Similar slugs are mounted in other arms (not shown) of the spider so that the diamond layers are co-planer. The spider is secured to the piston 56 of a hydraulic ram (not shown).

The burnishing medium is provided by a plurality of similar cylindrical carbide slugs 57 mounted in a rigid wheel 58 so that the diamond faces 59 on the slugs are co-planer. These diamond layers can be the same diameter as the diamond being polished, or preferably are of a different size, such as 9.5 millimeters. The diamond layers are placed as close together as possible on the face of the wheel to maximize the diamond area while still leaving a narrow flow path between the slugs for cooling water flow. Cooling water is readily provided by merely flooding the wheel inboard of the spiders so that the centrifical action of the rotating wheel carries the cooling water radially outward. The carbide slugs 57 are brazed into cylindrical sockets in the wheel. This can be done by placing the wheel face down with the diamond faces 59 on a flat surface. A vent hole 61 through the wheel can be used to admit a probe that assures that each diamond layer is in tight engagement with the flat surface. The hole also serves as a vent during furnace brazing. Irregularities in the resultant diamond surface can be removed by conventional diamond grinding and lapping or by burnishing as provided in practice of this invention. It will also be apparent that instead of using circular diamond faces, other shapes such as hexagons, squares, or trapezoids may also be employed for controlling the geometry of the cooling flow paths between the diamond faces and for maximizing the area of diamond on the wheel. Such a wheel is more costly to fabricate because of the need for non-round holes for the inserts.

To burnish the diamond layer 51, the wheel is rotated and the spider pressed toward the wheel with controlled force. By varying this pressure and the velocity of the wheel, burnishing can be controlled in a manner similar to what was hereinabove described.

When burnishing a flat diamond in such an apparatus, almost all of the material is removed from the layer being burnished, with very little material removal from the diamonds on the wheel. This is because of the very different cooling regimes of the wheel and the diamond being polished. The diamond faces on the inserts in the wheel are essentially continually cooled as the wheel rotates, except when in contact with the diamond being burnished. They therefore have an equilibrium temperature near that of the cooling water. The diamond layers in the spider are intermittently cooled by water in the passages between the diamond faces on the wheel. There is also some conduction cooling through the diamond, cemented carbide and steel spider. The result is that the equilibrium temperature of the diamond being burnished may be substantially above the temperature of the cooling water. Thus, for a given amount of frictional heating, the temperature at the surface of the diamond being burnished can be substantially higher than the temperature of the diamond layers on the wheel. This results in thermal degradation of the diamond being burnished with little, if any, degradation of the diamonds on the wheel.

An arrangement as illustrated in FIGS. 5 and 6 can be used to minimize waviness in the diamond being burnished as well as substantially eliminating scratches. This is accomplished by moving the diamond being burnished radially relative to the wheel so that different paths on the wheel are traversed by the diamond. This is readily accomplished by mounting the spider eccentrically relative to the wheel and gradually rotating or oscillating the spider. Alternatively, radial movement is readily accomplished in a four-arm spider by translating the spider parallel to one side of a square array of diamonds mounted in the spider. This has the advantage of making a small change in the angle that diamonds on the wheel rub across the diamond being burnished as well as shifting the path on the wheel traversed. This is, in effect, a slight rotation of the diamond being burnished, further enhancing the reduction of waviness.

It will be noted that in the arrangement of diamond faces on the wheel illustrated in FIGS. 5 and 6, the diamond being burnished is continuously in contact with a substantial diamond area on the wheel even though bridging across gaps between the diamond faces. On a large scale, the surface of diamond on the wheel is complementary to the flat surface on the diamond being burnished. The flat surface of the wheels is, however, discontinuous since it is interrupted with cooling channels for intermittently cooling the surface of the diamond being burnished.

Figure 7:
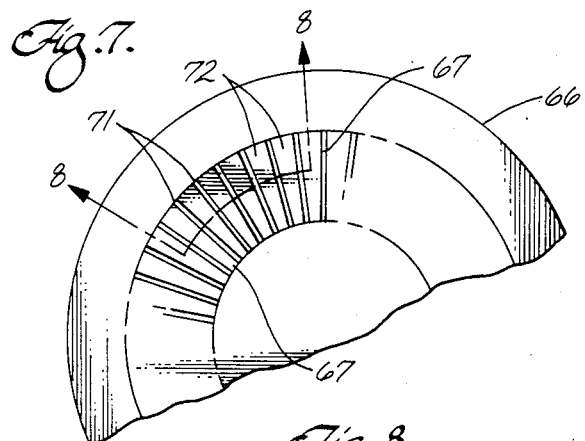
FIG. 7 is a fragmentary view of the face of an exemplary wheel for burnishing small diamonds.
Figure 8:
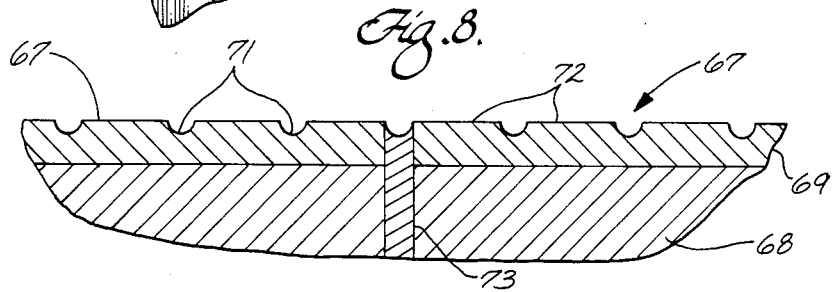
FIG. 8 is a fragmentary cross section of the wheel of FIG. 7.

When a smaller diamond is being burnished, such as a facet on a gemstone, a somewhat different configuration of wheel is used to assure that there is adequate area of diamond between the cooling channels for continuously supporting the diamond being burnished. One embodiment of suitable wheel is illustrated in the fragmentary views in FIGS. 7 and 8.

As illustrated in this embodiment, the wheel 66 has a plurality of diamond faces 67, each of which is in the form of a truncated radial sector of a circle. These diamond sectors are assembled in almost abutting relation to fill in annulus on the face of the wheel. In an exemplary embodiment the sectors each have a cemented tungsten carbide substrate 68 brazed into the wheel with an exposed polycrystalline diamond layer 69 at the face of the wheel. The diamond layer has a plurality of radiating grooves 71 that may be about 0.3 to 0.4 millimeters wide. The lands 72 between the grooves may be in the order of 1 millimeter or more in circumferential width and collectively the lands form a plane surface. The small space between the adjacent sectors is filled with brazing alloy 73. This may also be grooved at the surface to provide a cooling channel analogous to the cooling grooves 71. Such a wheel is appropriate for burnishing diamonds with relatively small areas. A very stiff dop is used for pressing the diamond against the rapidly rotating wheel with enough pressure to burnish the diamond.

Figure 9:
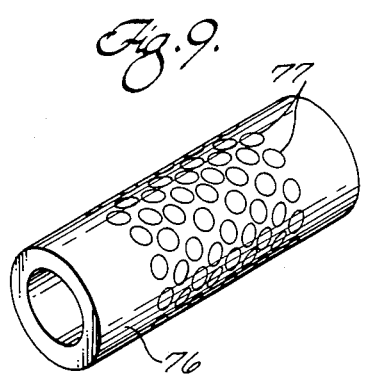
FIG. 9 is an isometric semi-schematic view of an exemplary cylindrical diamond bearing which can be polished in practice of this invention.

FIG. 9 illustrates an exemplary cylindrical diamond bearing for carrying radial loads. Such a bearing has a steel shaft or sleeve 76 with curved diamond pads 77 on a cemented carbide substrate embedded therein to collectively form an external cylindrical surface. It is not ordinarily feasible to polish or burnish such a surface in direct engagement with a mating bearing sleeve since wear of the two parts can result in too loose a fit. A suitable arrangement for polishing such a cylindrical bearing is illustrated schematically in FIG. 10.

The bearing sleeve 76 is rotated in one direction with its external face in engagement with a drum 78 of larger diameter. The external face of the drum has diamond pads (not shown) embedded therein much the same as the sleeve 76. The drum rotates in the opposite direction from the sleeve for achieving a high relative velocity at the engaging surface.

Cooling water is introduced into the nip between the rotating sleeve and drum, to be carried through the interface where burnishing occurs. The drum is rotated at a higher peripheral speed than the sleeve and water is added at the top of the nip. Water is thereby swept between the sleeve and drum in the spaces between the diamond pads.

It is desirable to burnish the diamond faces 77 on the sleeve with minimal wear of the diamond faces on the drum 78. One way to accomplish this is to heat the sleeve 76 internally while at the same time cooling the drum 78 internally. One can also shield the sleeve so that cooling water introduced into the nip between the drum and sleeve has limited contact with the sleeve and extensive contact with the drum. The higher equilibrium temperature of the diamond on the sleeve promotes greater thermal degradation of the faces being burnished than of the diamond faces on the burnishing drum.

Figure 10:
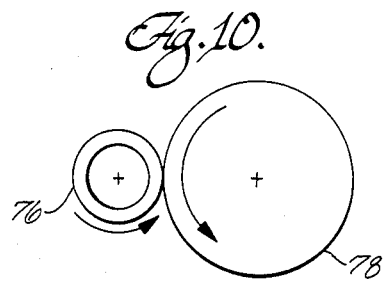
FIG. 10 illustrates schematically a technique for burnishing a cylindrical diamond bearing as illustrated in FIG. 7.

In an arrangement as illustrated in FIG. 10, waviness of the surface being burnished can be minimized by shifting the drum axially relative to the sleeve so that burnishing of a given area on the sleeve is not continually by the same area on the drum. It will also be apparent that if desired, the drum can have an axial extent different from the length of the sleeve and can be moved axially along the sleeve for burnishing, much as one would use a grinding wheel to grind a long shaft. It will also be apparent that, if desired, a pair of drums can be used on opposite sides of the sleeve for doubling the rate of burnishing and providing a backup to prevent bending of the sleeve under high transverse loads.

Figure 11:
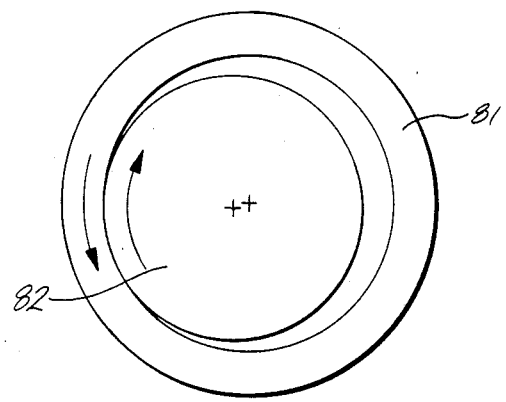
FIG. 11 illustrates schematically a technique for burnishing the inside of a cylindrical diamond bearing.

FIG. 11 illustrates schematically a suitable arrangement for burnishing the diamond pads (not shown) inside a cylindrical bearing sleeve 81. A burnishing drum 82 can be provided inside the sleeve with diamond faced inserts for polishing the diamond pads inside the sleeve. The drum is mounted eccentrically with respect to the sleeve and is rotated in the opposite direction from the sleeve to obtain a high surface velocity. Cooling water is fed into the nip between the sleeve and drum at the advancing side of the rotating member having a higher speed and the retreating side of the member having the lower speed. For example, if the surface speed of the sleeve 81 is twice the surface speed of the drum 82, cooling water would be introduced at the top to be swept through the interface between the two members.

As in the embodiment illustrated in FIG. 10, burnishing of the diamonds in the sleeve is promoted by heating the sleeve and cooling the drum, thereby assuring that the degradation temperature is achieved at the surface of the diamonds in the sleeve without appreciable degradation of the diamonds on the drum. Further, as mentioned above, the drum and sleeve are preferably moved axially relative to each other for minimizing waviness. It can also be desirable to employ a drum having a substantially shorter length than the sleeve so that a higher local Pv can be obtained with a given force between the sleeve and drum.

Figure 12:
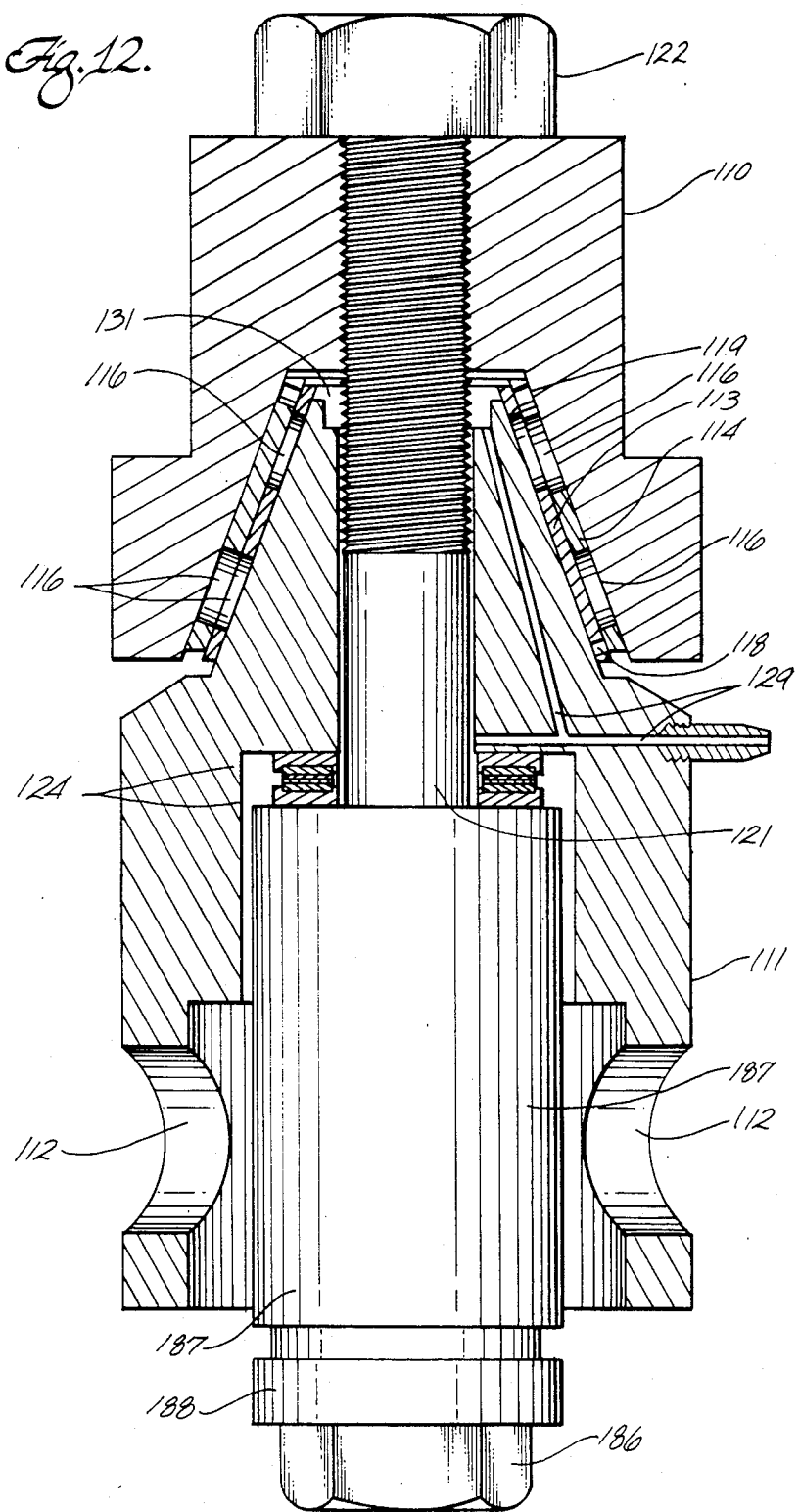
FIG. 12 illustrates in longitudinal cross section another device for burnishing a set of conical diamond bearing members.

FIG. 12 illustrates another embodiment of apparatus for burnishing a set of conical diamond beawrings as hereinabove described and illustrated. The apparatus is generally similar to the one described and illustrated in FIG. 1. Since many of the parts of the device are similar, the same reference numerals are used ion FIG. 12 to refer to the same parts as in FIG. 1, except that each reference numeral has been increased by 100. Thus, for example, diamond bearing pads identified as 16 in FIG. 1 are identified as 116 in FIG. 12. Since most of the parts are substantially identical, only those parts that are different are specifically described.

Instead of applying a load on the bearings by tightening a bolt against Belleville washers, the embodiment illustrated in FIG. 12 emnploys a hydraulic actuator which enhances the speed and accuracy of application of varying load on the bearings. In this embodiment the bolt 121 is somewhat longer than in the embodiment illustrated in FIG. 1 and instead of having a head it is threaded at its outer end for receiving a nut 186. A hollow hydraulic actuator 187 is positioned between the nut 186 and the plug 111 which supports the inner bearing sleeve 113. The head of the hollow piston 188 of the actuator bears against the nut so that the bolt is placed in tension, thereby pulling the plug 111 and socket 110 towards each other and loading the bearings being burnished.

A conventional hydraulic actuator of the type employed in this device includes a built in linear variable differential transformer to measure the displacement of the piston. This displacement measure is usefully employed in practice of this invention.

When this device is used, the socket is chucked in a lathe and the plug held stationary against rotation as hereinabove described. The lathe is run at a selected speed setting such as, for example, 1200 RPM. Cooling water is applied to the bearings using a positive displacement pump that can deliver water at a carefully controlled and adjustable rate. The current on the lathe motor is measured, which provides a measure of the torque resisting rotation of the bearings. Pressure on the hydraulic cylinder can be varied for applying a controlled load on the bearings. Displacement of the piston of the hydraulic cylinder can be measured for determining the rate of burnishing of the bearing.

As burnishing proceeds with rapid generation of non-diamond carbon in the interface, the coefficient of friction is higher than when there is diamond-on-diamond contact. Thus, to optimize the rate of burnishing, the resisting torque is increased to a level that provides rapid burnishing but is less than would cause excessive thermal degradation to cause seizure of the bearings. An acceptable rate of displacement can be determined experimentally to be sufficient for rapid burnishing without seizing.

In one mode of operation the lathe is set at a given speed and a selected load is applied on the bearings by way of the hydraulic actuator. The flow rate of water is controlled electronically in response to current variations to maintain a torque level known to provide rapid burnishing. The burnishing can also be monitored by way of the displacement occurring as material is removed from the diamond interfaces. When the total displacement is sufficient to indicate that burnishing is completed to the desired extent, the apparatus is shut down. Burnishing can be discontinued by decreasing paressure, decreasing speed, or by increasing water flow.

In another mode of operation, lathe speed is constant and water flow is set at a sufficiently low rate to permit burnishing. Motor current is monitored and the pressure on the hydraulic actuator is varied in response to variations in current to maintain a desired rate of burnishing. If desired, displacement rather than current can be used for control but it appears that current is preferable.

In still another mode of operation of the device, speed can be kept constant and both water flow and pressure varied to maintain a desired high rate of burnishing. These can be continually varied or can be varied in predetermined increments. The variations can be simultaneous, independent, or alternating. It should be recognized that rotational speed can also be varied, but pressure and water flow are the preferable control variables.

When making a set of bearings for a rock bit, the conical bearing pads 116 and thrust bearings 124 may be burnished at the same time and the resultant set of bearings can then be used in one embodiment of rock bit. burnished, some of the burnishing occurs as the conical bearings are burnished. Adequate burnishing of the thrust bearing may not be achieved, however, with simultaneous burnishing since the loads and speeds are different on the two sets of bearings. Differential burnishing of the two types of bearings can readily be provided by isolating cooling water flow to the two bearing sets and introducing different water flow rates for preferential burnishing. For example, if the conical bearings are adequately burnished and additional burnishing is desired on the thrust bearings, a relatively high flow rate of water can be applied to the conical bearings while at the same time a low flow rate is applied to the thrust bearings. The high flow of water prevents further burnishing of the conical bearing while thermal degradation is promoted in the thrust bearing. Clearly the opposite can be practiced to promote burnishing of the conical bearing while inhibiting degradation of the thrust bearing.

It should also be recognized that a diamond-on-diamond bearing can be burnished in the apparatus in which the bearing is to be used in service. For example, the bearings of a rock bit can be burnished by assembling the rock bit and rotating the cone or cones with a $$\frac{Pv}{dQ/dt}$$

on the bearings greater than $$\frac{Pv}{dQ/dt}$$

of the bearings in service. In such an embodiment the bearings of the rock bit would be "open" or unsealed and cooling fluid such as drilling mud would be forced through the bearings as the bit is used. When burnishing the bearing, the flow of water through the bearing being burnished is less than when the bearing is in service to promote thermal degradation. Alternatively, the Pv can be increased to burnish the bearing in the apparatus in which it will be used.

Interestingly, since the mechanism of burnishing involves thermal degradation, it appears that superhard materials can be used to burnish each other. Diamond can be used to burnish cubic boron nitride (CBN) when the diamond is kept below its thermal degradation temperature. Diamond has a lower thermal degradation temperature than CBN and a temperature differential can be maintatined to assure that the CBN decomposes preferentially. More surprisingly, it appears diamond may be "burnished" by the softer CBN when an appropriate temperature differential is maintained. Care should be taken in such embodiments to avoid bearing pressures that would unduly deform CBN which has a lower modulus of elasticity than diamond. Burnishing CBN with a complementary CBN surface is similar to burnishing diamond on diamond.

The mechanism of thermal degradation believed to predominate is recrystallization of diamond to non-diamond carbon. It is known, however, that oxidizing substances promote thermal degradation at a lower temperature and it may be that some oxidation is also occurriong during burnishing. Thus, inclusion of materials with a higher oxidation potential than air may promote more rapid burnishing. Examples would include peroxide, permangate and perchlorate solutions, high oxygen or ozone concentrations in the burnishing environment, or the like.

A variety of arrangements have been described and illustrated for burnishing diamond in practice of this invention. It will be apparent that such techniques can be equally applicable to the other superhard materials, cubic boron nitride and wurtzitic boron nitride. It will also be apparent that other arrangements for burnishing diamonds can be provided by one skilled in the art. For example, where it is impractical to rotate a member with an internal diamond bearing, the diamonds can be burnished with a tool analogous to an expanding hone. Many other modifications and variations will be apparent to one skilled in the art and it is therefore to be understood that within the scope of the following claims, the invention may be practiced otherwise than as specifically described.

What is claimed is:

1. A method for burnishing superhard material comprising moving a surface of the superhard material to be polished along a substantially grit-free complementary superhard material surface at a sufficient pressure and velocity to polish the superhard material.

2. A method for polishing polycrystalline superhard material comprising intermittently applying frictional energy to an area of a surface to be polished larger than the area of a crystal at the surface for a sufficient interval to thermally degrade a uniform layer of such area of the surface.

3. A method for polishing superhard material comprising rubbing a surface of the superhard material to be polished against a smooth complementary polycrystalline superhard material surface with sufficient pressure and velocity to heat the surface being polished above the spontaneous thermal degradation temperature of the superhard material.

4. A method for polishing superhard material comprising:
rubbing a surface of the superhard material to be polished against a complementary superhard material surface,
flowing cooling liquid on at least one of the surfaces; and
controlling $$\frac{Pv}{dQ/dt}$$

between a lower limit below which no thermal degradation of the superhard material occurs and an upper limit above which film boiling of liquid occurs, wherein P is pressure between the superhard material surfaces, v is the velocity between the surfaces and dQ/dt is the rate of heat extraction by the liquid.

5. A method for polishing diamond comprising rubbing a surface of diamond to be polished against a smooth complementary diamond surface at a sufficient pressure and velocity and within a range of cooling
   (a) sufficient to elevate the temperature of a surface layer above the temperature where diamond spontaneously transforms to non-diamond; and
   (b) insufficient to heat the diamond below the surface layer to the thermal degradation temperature of diamond.

6. A method for polishing superhard material comprising:
   rubbing a surface to be polished against a smooth complementary superhard material surface with sufficient pressure and velocity to polish the superhard material; and
   intermittently cooling the surface of the superhard material being polished for inhibiting thermal degradation of the superhard material.

7. A method for polishing superhard material comprising alternately:
   rubbing a surface of the superhard material to be polished against a smooth complementary superhard material surface in the substantial absence of discrete superhard material particles; and
   cooling the surface being polished for inhibiting thermal degradation.

8. A method for finishing a set of complementary superhard material surfaces comprising rubbing the surfaces together without intervening abrasive at a sufficient pressure and velocity to burnish a portion of each of the superhard material surfaces to a smooth scratch-free surface.

9. A method for polishing diamond comprising moving the diamond along a rigid complementary diamond surface with a Pv of at least 7 kilowatts per square centimeter, where P is pressure between the diamond and the complementary surface and v is the velocity of movement.

10. A method for burnishing superhard material comprising:
    rubbing the superhard material against a smooth complementary superhard material surface in the substantial absence of discrete superhard material particles with sufficient pressure and velocity to burnish the superhard material surface, the complementary surface including a plurality of recessed discontinuities; and
    introducing sufficient liquid coolant in the discontinuities for inhibiting thermal degradation of the superhard material being burnished.

11. A method for finishing a bearing having smooth complementary polycrystalline diamond surfaces comprising running the diamond surfaces against each other at a sufficient pressure P and velocity v that the product Pv is greater than the maximum Pv of the bearing in service and sufficient to transform a portion of each diamond surface from diamond to non-diamond.

12. A method for finishing superhard material comprising the steps of:
    moving the surface of the superhard material against a smooth complementary superhard material surface at a selected pressure and velocity;
    sensing the friction force between the surfaces at the selected pressure and velocity; and
    after the friction force has decreased from a maximum at the selected pressure and velocity, increasing the product of pressure times velocity to a larger selected value.

13. A method for finishing a fluid cooled diamond-on-diamond bearing comprising running the bearing at at least two times the $\frac{Pv}{dQ/dt}$ $\frac{Pv}{dQ/dt}$ in its intended service where P is the bearing pressure, v is the linear velocity of the bearing, and dQ/dt is the rate of heat extraction by the fluid coolant.

14. A method for polishing diamond comprising:
    rubbing a surface of the diamond to be polished against a complementary diamond surface with a sufficient pressure and velocity to polish the surface of the diamond; and
    maintaining the temperature of the diamond being polished higher than the temperature of the complementary diamond surface.

15. A method as recited in claim 14 comprising selectively heating the diamond being polished.

16. A method as recited in claim 14 comprising selectively cooling the complementary diamond surface.

* * * * *